(12) United States Patent
Bruegger et al.

(10) Patent No.: US 7,200,660 B2
(45) Date of Patent: Apr. 3, 2007

(54) PROCEDURE AND CONFIGURATION IN ORDER TO TRANSMIT DATA

(75) Inventors: Peter Bruegger, Muttenz (CH); Matthias Baumgartner, Biel-Benken (CH); Fabien Jambois, Rixheim (FR); Jean-Marc Adam, Eschentzwiler (FR)

(73) Assignee: iniNet Solutions GmbH, Reinach (CH)

( * ) Notice: Subject to any disclaimer, the term of this patent is extended or adjusted under 35 U.S.C. 154(b) by 646 days.

(21) Appl. No.: 10/217,561

(22) Filed: Aug. 12, 2002

(65) Prior Publication Data

US 2003/0033414 A1 Feb. 13, 2003

(30) Foreign Application Priority Data

Aug. 10, 2001 (CH) ............................. 2001 1481/01

(51) Int. Cl.
*G06F 15/173* (2006.01)
(52) U.S. Cl. .................. 709/225; 709/219; 709/224; 709/245; 726/23; 726/26
(58) Field of Classification Search ................ 709/203, 709/224, 245; 726/23, 26–30
See application file for complete search history.

(56) References Cited

U.S. PATENT DOCUMENTS

| | | | |
|---|---|---|---|
| 5,974,496 A * | 10/1999 | Miller | 710/315 |
| 6,529,706 B1 * | 3/2003 | Mitchell | 455/12.1 |
| 6,741,841 B1 * | 5/2004 | Mitchell | 455/188.1 |
| 6,904,449 B1 * | 6/2005 | Quinones | 709/203 |
| 2001/0047420 A1 * | 11/2001 | Talanis et al. | 709/229 |

* cited by examiner

*Primary Examiner*—Saleh Najjar
*Assistant Examiner*—Liang-che Alex Wang
(74) *Attorney, Agent, or Firm*—Abelman, Frayne & Schwab

(57) ABSTRACT

Procedure to transmit data, especially data used to operate and observe a system in which a request to build up a transfer channel to a web server is sent from a web client, comprising the following properties:
- a message that demands a connection to build up a first transfer channel is sent to a web server from the system that needs to be watched or operated;
- this request stays open and thus creates a tunnel for data transfer between system and web server;
- at least one additional channel of transfer is generated while the web client requests connection between client and web server;
- the client establishes contact with the system via the data transfer tunnel in order to send and receive reference data bi-directionally.

20 Claims, 1 Drawing Sheet

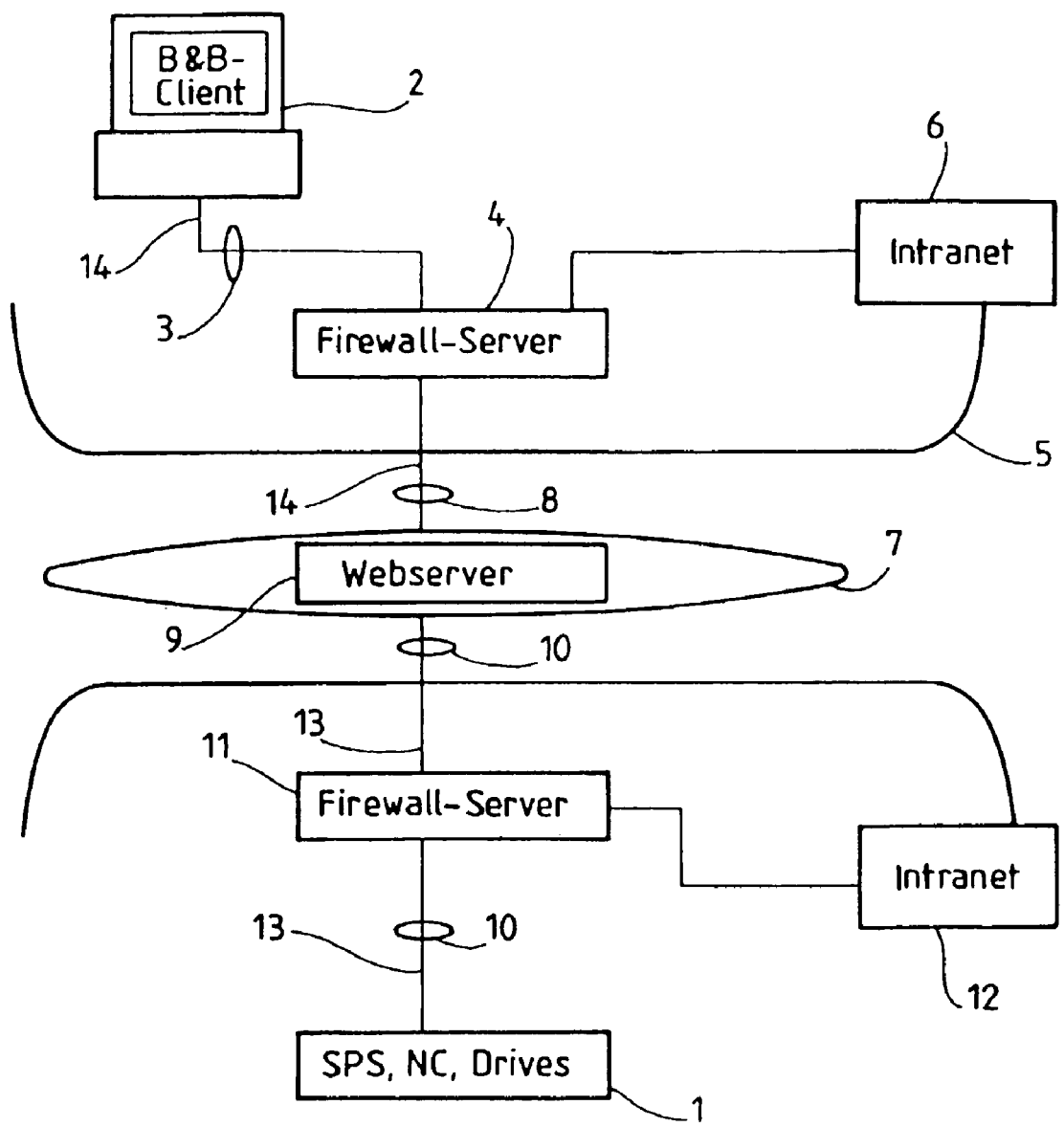

PROCEDURE AND CONFIGURATION IN ORDER TO TRANSMIT DATA

BACKGROUND OF THE INVENTION

1. Field of the Invention

The present invention is concerned with a procedure as well as a configuration in order to transmit data, especially data that is used in order to operate, monitor and control an external system.

It is possible to establish a data connection to a web server (WS) or Internet information server (IIS) from any computer through the WWW (World Wide Web), which is also known as the Internet. A WS or an IIS can be accessed via an Internet browser such as Microsoft's Internet Explorer or Netscape's browser.

While establishing a data connection from a web client a request is sent to an Internet server via the input of a URL address. If the connection works, the Internet server answers with an HTML site (HTML=hypertext markup language). WWW clients such as Netscape or the Internet Explorer communicate with the WWW server via the hypertext transport protocol (HTTP). Any data connection is thus based on a request protocol and, as a response to that, a response protocol.

2. Description of the Prior Art

Due to the limited capacities of transfer on the Internet and the wish to load more quickly, data structures on the Internet are built up efficiently. An average HTML site contains only few Kbytes; images are compressed with efficient algorithms, and applicative programs such as Java applets are interpreted by browsers. This relieves the source of the data in terms of storage capacity and CPU performance. Furthermore, operator control and monitoring surfaces can be easily created by means of web technology and popular software applications. Handling operator control and monitoring can be achieved with standard browsers whose use is generally known and whose interpretation can be grasped intuitively.

These features are required for the already very popular application of web server technology for the monitoring, controlling and remote maintenance of industrial systems and processes.

It is thus possible to access a remote web server of the system that needs to be operated/monitored via an Internet browser of a web client. The web server of the system can be accessed directly via a point-to-point connection (PP) or via the telephone by means of a modem. The web server can either be visible on the Internet directly via a hosting provider or it will be used within an Intranet or WANs.

The advantages of this application of web server technology for remote maintenance of systems via the Internet are obvious. For example, operator control and monitoring surfaces can be easily constructed by means of well-known Microsoft tools such as Word, Excel, PowerPoint and so on; they can be operated with user-friendly standard browsers Microsoft Internet Explorer and Netscape Communicator.

However, this well-known application of web server technology has one disadvantage when it comes to web servers which are visible on the Internet. The system that is monitored or controlled does usually not have permanent and transparent access to the Internet due to financial and security reasons.

Access to the Internet is now possible from any workplace via a modem or a dedicated line. However, the connection opened up by an Internet services provider (ISP) for a web browser has only very limited bi-directional usability. Therefore, company networks normally use an address that is not Internet-compatible. Internet access takes place via specifically configured proxy servers, routers, switches and firewalls. Additionally, Internet services providers (ISPs) have their own IP addresses. An address is assigned dynamically to each customer as soon as they access the Internet. Firewalls and proxy servers may be configured in some networks in such a way that they are capable of bi-directional data exchange; however, this kind of configuration is relatively complicated and often fails in practice due to lacking feasibility.

SUMMARY OF THE INVENTION

It is the object of the invention to suggest a procedure and a configuration in order to transmit data bi-directionally between two connectable data processing devices/appliances, wherein one data processing appliance is operated, monitored and controlled by another data processing appliance and wherein data transfer via the Internet specifically enables the procedure and the configuration of bi-directional data transfer even across firewalls.

This object is achieved by a procedure to transmit data, especially data used to operate and observe a system in which a request to build up a transfer channel to a web server is sent from a web client, which procedure comprises the following properties:

a message that demands a connection to build up a first transfer channel is sent to a web server from the system that needs to be watched or operated;

this request stays open and thus creates a tunnel for data transfer between the system and web server;

at least one additional channel of transfer is generated while the web client requests connection between client and web server;

the client establishes contact with the system via the data transfer tunnel in order to send and receive reference data bi-directionally.

A further object of the invention is a configuration in order to implement the procedure, with two connectable data processing devices, an automation system, at least one web client that serves to operate, observe, control and perhaps for remote maintenance of the automation system, and a web server, wherein the automation system serving to build up a first data connection with the web server in the shape of a tunnel and at least one of the clients serving to build up at least one additional data connection that may be connected to the tunnel to the web server.

The invention is mainly based on the use of web software that is usually present in well-known data processing systems and is characterized by building up a connection between the two data processing appliances/devices in one step by the device that has to be monitored and watched, henceforth called system. This system and/or its servers work as a client (browser) for the ISP, so that the present net and web configurations of the data processing devices that have to be connected can be implemented as a means to the solution of the task according to the invention without any costly adaptations and adjustments.

The object of the invention can thus be solved easily by the system that has to be watched or monitored sending a first demand for a first channel of transfer to a central web server that is not part of the system. When dealing with a demand for connection from a web client to the web server, e.g. an operator control and monitoring system, a second channel of transfer is created between client and web server, and the client comes into contact with the system by using the first channel as a tunnel for bi-directional sending and receiving of reference data.

The system that should be accessed for a remote entity has in terms of the invention a browser or a similar software that accesses the central web server via an HTTP command; this access cannot be differentiated from a conventional access initialized by a web browser.

Whereas conventionally a file is being opened by a web server and is then transferred back to the caller, the invented procedure leaves this inquiry open, it thus stays unanswered or the duration of the answer is lengthened infinitely, and—as already mentioned—the connection channel is used as a tunnel to forward connection inquiries by clients coming via the same web server to the system.

The invented procedure thus offers a data connection by which the client can communicate as a operator control and monitoring system with the system that has to be monitored and/or operated. Between client and server or in other words between operating system and monitoring system and the automation system a functionally bi-directional data connection is ensured so that a transfer of reference data in both directions between client and server is made possible. This kind of data connection is especially suitable for operating and monitoring of an automation system via the Internet. The client may work as a operator control and monitoring system which may be activated by any computer that is connected to the Internet. Unlike conventional Internet data connection this results in a procedure of data transfer where neither the client nor the system that has to be operated needs to be visible on the Internet or to have installed a web server (IIS—Internet Information Server). Therefore it is possible to build up a bi-directional data connection from any place in the world, before and behind firewalls and from a web client or from the automation system. The data connection between web server and automation system is established by means of a browser or a similar software; thus, the already described disadvantages of conventional procedures can be easily fixed by means of a surprisingly simple method. Maintaining the data connection or data connections can at best be ensured by transmitting fake data, if no reference data are present. Furthermore, in order to ensure a permanent data connection, information saying that there will be more transfer of reference data can be sent to the web server.

The procedure is a particularly advantageous application that uses already present Internet infrastructures for a bi-directional data transfer: it may not only be used for operator control and monitoring but also for remote maintenance of an automation system.

BRIEF DESCRIPTION OF THE SEVERAL VIEWS OF THE DRAWINGS

FIG. 1 is a schematic illustrating a system for transmitting data bi-directionally according to the present invention.

DESCRIPTION OF THE PREFERRED EMBODIMENT

In the following the invention shall be more closely described on the basis of an example of implementation as represented in FIG. 1. FIG. 1 shows a configuration to operate, monitor, control and for remote maintenance of a system 1, that has e.g. programmable logic controller (PLC), numerical control (NC) or drives.

The configuration also has a operator control and monitoring system 2 (operator control and monitoring client) which has an internal network 2, e.g. Ethernet linked up with a firewall computer 4. A local intranet address that is not necessarily visible on the Internet is assigned to the operator control and monitoring system 2. Line 5 implies the firewall of firewall computer 4 that surrounds the internal communication network 6 of firewall server 4.

The world wide communication network known as the Internet is denoted by 7. The firewall computer 4 is linked up via a connection line 8, e.g. via ISDN, with Internet 7. Operator control and monitoring system 2 and automation system 1 are assigned to a central web server 9. This central web server 9 is in this case an Internet web server and may be called from client 2 as well as automation system 1 via the Internet. The call of the Internet web server 9 from automation system 1 is made via a connection line 10 and a second firewall computer 11 that is assigned to the system. Firewall computer 11 surrounds intranet 12 that is assigned to firewall computer 11.

To build up a connection between client 2 and system 1 the invented, asymmetrical procedure is used. To achieve this, system 1 sends a first request to Internet web server 9 that is answered (should the occasion arise). This request is prolonged indefinitely in order to avoid a temporal interruption. This way a first transfer channel, a so-called tunnel, is created. Any web client that is registered on the Internet can at any time send data to the system via this tunnel. This first data transfer channel is identified as number 13 in the drawing.

Building a second data transfer channel 14 occurs by client 2 sending a request (i.e. a demand for connection to Internet web server 9 of automation system 1) and in this way creating a bi-directional connection between system 1 and client 2 via Internet web server 9.

According to the invention the Internet web server 9 functions as an intermediary of the connection between web client 2 and automation system 1. After establishing of the connection between web client 2 and system 1 Internet web server 9 this connection may last permanently. It is however also possible to generate a data connection between web client 2 and system 1 that is independent/separated from the web server after establishing the connection. Web server 9 may then no longer be needed for observing, operating and perhaps remote maintenance of system 1 and may thus be only a temporary web server for the invented procedure.

Internet web server 9 preferably communicates with web client 2 and system 1 via the HTTP protocol that is widespread on the Internet. However, this communication—within the scope of this invention—also works with other, similar protocols.

To sum it up, a bi-directional reference data communication via the Internet is created; it is induced at the same time and from both sides and temporally independent. It will thus also be possible to use conventional ways of communicating via the Internet in the area of automation and remote maintenance technology by means of web browser technology for the purposes of operating and observing.

In a special form of implementation/embodiment of the inventive configuration that is shown in the FIGURE, automation system 1 can additionally run an additional local web server that is not depicted in the FIGURE. In this case, the inventive "tunnel service" can act as an intermediary of the HTTP protocol between Internet web server 9 and the web server of system 1.

A further development of the above described configuration consists in the fact that Internet web server 9 pictures transparently many different systems 1 at the same time by assigning to any pictured system 1 an obvious path at least for one client 2 that is visible to at least one client 2. In this case access appears for the clients as an access to a subdirectory on Internet web server 9. A cascading of several Internet web servers 9 is intended in the case of another further development of the configuration in the sense of the invention in order to make transparent several barriers in networks that are connected through e.g. gateways, proxy servers, routers and switches.

In another embodiment of the invention the configuration is implemented with web server 9 and the same technology and the same components in an Intranet or WAN surrounding without direct utilization of the Internet.

Within another embodiment of the invention the central web server 9 serves as a web client 2 or is installed in its surroundings.

Access of a web client 2 on system 1 presupposes an existing browser or similar connection between web server 9 and system 1. If system 1 is not permanently connected to web server 9 this connection has to be activated before the client logs on to web server 9. This may occur in different ways. The construction of a connection channel 13 can be completed by operation personnel of the system manually, or system 1 opens this tunnel periodically to web server 3 according to a beforehand defined program and opens an access window for a certain duration for at least one client. Another possibility for indexing connection establishment consists in the case that the web server (possibly visible on the Internet) sends a request to system 1 via another communication channel while logging on to a client 1. This channel may be realized/implemented by sending a message via e-mail or sending a text message via SMS (short message service)

calling a modem that is directly connected to system 1 or notification via an additional software.

What is claimed is:

1. Method of transmitting data for operating and observing an automation system embedded in a first internal network protected by a first firewall from a remote client embedded in a second internal network independent from the first internal network, without the authorization to pass the firewall, via the World Wide Web of the Internet using the Hypertext Transfer Protocol (HTTP), comprising the steps of:
   a) the automation system sends a first connection request by means of a HTTP command to a central web server located in the World Wide Web outside the area protected by the first firewall, whereby the first connection request cannot be distinguished by the first firewall from a regular web browser access;
   b) the connection request is kept open thereby generating a data transfer tunnel between the automation system and the central web server;
   c) the remote client sends at least one second connection request by means of a HTTP command to the central web server in the World Wide Web; and
   d) the data transfer tunnel between the automation system and the web server is used to establish a contact for bi-directionally sending and receiving reference data; whereby no Internet Protocol (IP) address of the automation system has to be known to the World Wide Web.

2. Data transmitting method according to claim 1, wherein the second internal network in which the remote client is embedded is protected by a second firewall.

3. System for performing the method according to claim 2, with two data processing devices connectable for bi-directional data transfer, comprising the automation system embedded in the first internal communication network protected by the first firewall, the remote web client for serving, operating, observing, controlling, and remotely maintaining the automation system, and the central web server located in the World Wide Web outside of the first internal communication system of the automation system, wherein the automation system is provided with means for building up a data connection with the central web server which the remote web client, which builds up at least one additional data connection to the central web server, uses as the data transfer tunnel to communicate with the automation system.

4. System according to claim 3, wherein the central web server acting as intermediary is installed on the remote web client or in its surroundings.

5. System according to claim 4, wherein the web server is able to picture several automation systems at the same time transparently by assigning to every pictured automation system an obvious path that is visible on at least one web client.

6. System according to claim 5, wherein the central web server includes a cascading arrangement of several World Wide Web servers in order to make transparent several barriers in connected networks that are linked by gateways, proxy servers, routers, or switches.

7. System according to claim 4, wherein a cascading of several World Wide Web servers is arranged in order to make transparent several barriers in connected networks that are linked by gateways, proxy servers, routers, or switches.

8. System for performing the method according to claim 2, with two data processing devices connectable for bi-directional data transfer, comprising the automation system embedded in the first internal communication network protected by the first firewall, the remote web client for serving, operating, observing, and controlling the automation system, and the central web server located in the World Wide Web outside of the first internal communication system of the automation system, wherein the automation system is provided with means for building up a data connection with the central web server which the remote web client, which builds up at least one additional data connection to the central web server, uses as the data transfer tunnel to communicate with the automation system.

9. Data transmitting method according to claim 1, wherein the tunnel connection between the automation system and the central web server is generated either according to a predefined program periodically for a certain duration of time or manually or due to a separate request to the automation system before a web client logs on.

10. System for performing the method according to claim 9, with two data processing devices connectable for bi-directional data transfer, comprising the automation system embedded in the first internal communication network protected by the first firewall, the remote web client for serving, operating, observing, controlling, and remotely maintaining the automation system, and the central web server located in the World Wide Web outside of the first internal communication system of the automation system, wherein the automation system is provided with means for building up a data connection with the central web server which the remote web client, which builds up at least one additional data connection to the central web server, uses as the data transfer tunnel to communicate with the automation system.

11. System according to claim 10, wherein the central web server acting as intermediary is installed on the remote web client or in its surroundings.

12. System according to claim 11, wherein the web server is able to picture several automation systems at the same time transparently by assigning to every pictured automation system an obvious path that is visible on at least one web client.

13. System according to claim 12, wherein a cascading of several World Wide Web servers is arranged in order to make transparent several barriers in connected networks that are linked by gateways, proxy servers, routers, or switches.

14. System according to claim 11, wherein a cascading of several World Wide Web servers is arranged in order to make transparent several barriers in connected networks that are linked by gateways, proxy servers, routers, or switches.

15. System for performing the method according to claim 1, with two data processing devices connectable for bi-directional data transfer, comprising the automation system embedded in the first internal communication network protected by the first firewall, the remote web client for serving, operating, observing, controlling, and remotely maintaining the automation system, and the central web server located in the World Wide Web outside of the first internal communication system of the automation system, wherein the automation system is provided with means for building up a data connection with the central web server which the remote web client, which builds up at least one additional data connection to the central web server, uses as the data transfer tunnel to communicate with the automation system.

16. System according to claim 15, wherein the central web server acting as intermediary is installed on the remote web client or in its surroundings.

17. System according to claim 16, wherein the web server is able to picture several automation systems at the same time transparently by assigning to every pictured automation system an obvious path that is visible on at least one web client.

18. System according to claim 17, wherein a cascading of several World Wide Web servers is arranged in order to make transparent several barriers in connected networks that are linked by gateways, proxy servers, routers, or switches.

19. System according to claim 16, wherein a cascading of several World Wide Web servers is arranged in order to make transparent several barriers in connected networks that are linked by gateways, proxy servers, routers, or switches.

20. System for performing the method according to claim 1, with two data processing devices connectable for bi-directional data transfer, comprising the automation system embedded in the first internal communication network protected by the first firewall, the remote web client for serving, operating, observing, and controlling the automation system, and the central web server located in the World Wide Web outside of the first internal communication system of the automation system, wherein the automation system is provided with means for building up a data connection with the central web server which the remote web client, which builds up at least one additional data connection to the central web server, uses as the data transfer tunnel to communicate with the automation system.

* * * * *